United States Patent
Ito et al.

(10) Patent No.: US 8,672,541 B2
(45) Date of Patent: Mar. 18, 2014

(54) TEMPERATURE SENSOR

(75) Inventors: Masamichi Ito, Iwakura (JP); Koji Matsuo, Kasugai (JP); Satoshi Ishikawa, Kani (JP)

(73) Assignee: NGK Spark Plug Co., Ltd., Aichi (JP)

( * ) Notice: Subject to any disclaimer, the term of this patent is extended or adjusted under 35 U.S.C. 154(b) by 21 days.

(21) Appl. No.: 13/213,033

(22) Filed: Aug. 18, 2011

(65) Prior Publication Data
US 2012/0044972 A1    Feb. 23, 2012

(30) Foreign Application Priority Data
Aug. 19, 2010  (JP) .................................. 2010-184401

(51) Int. Cl.
*G01K 7/00*    (2006.01)

(52) U.S. Cl.
USPC ........... 374/183; 374/208; 374/141; 374/143; 374/144; 374/163

(58) Field of Classification Search
USPC ...................... 374/185, 183, 208, 163; 338/25
See application file for complete search history.

(56) References Cited

U.S. PATENT DOCUMENTS

| 6,639,505 B2 | 10/2003 | Murata et al. |
| 7,104,685 B2 * | 9/2006 | Hanzawa et al. ............. 374/208 |
| 2006/0013282 A1 * | 1/2006 | Hanzawa et al. ............. 374/163 |

FOREIGN PATENT DOCUMENTS

| JP | 2002-350241 A | 12/2002 |
| JP | 2010-32237 A | 2/2010 |

* cited by examiner

*Primary Examiner* — Lisa Caputo
*Assistant Examiner* — Janice M Soto
(74) *Attorney, Agent, or Firm* — Sughrue Mion, PLLC

(57) ABSTRACT

A temperature sensor (100) includes a heat-sensitive element (21) having a thermistor sintered-body (22), an insulating support (31), an insulation sheath (41) and a housing tube (11). The insulating support (31) is in contact with the rear end of the heat-sensitive element (21) and the insulation sheath (41) is in contact with the rear end of the insulating support (31). The housing tube (11) accommodates the heat-sensitive element (21), the insulating support (31) and the insulation sheath (41). The housing tube (11) includes a sheath accommodation portion (14) which accommodates the insulation sheath (41) and a distal accommodation portion (13). The distal accommodation portion (13) is located toward the distal end of the housing tube (11) with respect to the sheath accommodation portion (14), is smaller in outside diameter than the sheath accommodation portion (14), and accommodates at least half of the insulating support (31) as measured from the axially distal end of the insulating support (31).

8 Claims, 3 Drawing Sheets

FIG. 3

| No. | Volume of heat-sensitive element (mm³) | Volume of insulating support (mm³) | Positional relation between insulating support and housing tube | Lapping percentage (%) | Response time (sec) |
|---|---|---|---|---|---|
| 1 | 11.6 | 5.7 | Not close | 0 | 10.6 |
| 2 | 2.4 | 5.3 | Close | 60 | 5.3 |
| 3 | 2.4 | 8.8 | Close | 70 | 4.7 |

TEMPERATURE SENSOR

BACKGROUND OF THE INVENTION

1. Field of the Invention

The present invention relates to a temperature sensor for measuring the temperature of a fluid, such as exhaust gas or intake gas.

2. Description of the Related Art

Conventionally, a temperature sensor having a heat-sensitive portion whose electric characteristic varies with temperature is known. The temperature sensor is attached to, for example, an exhaust pipe of an automotive engine and is adapted to measure the temperature of exhaust gas flowing through the exhaust pipe. The heat-sensitive portion of the temperature sensor is composed of, for example, a thermistor sintered-body whose resistance varies with temperature. A pair of electrodes for detecting the resistance of the heat-sensitive portion is disposed in such a manner that the heat-sensitive portion is sandwiched therebetween. The heat-sensitive portion and the pair of electrodes are sealed in a seal portion formed of glass or the like, thereby forming a heat-sensitive element. An insulating support for supporting the heat-sensitive element is provided on the rear side of the heat-sensitive element. An insulation sheath is provided on the rear side of the insulating support. The insulation sheath allows for wires electrically connected to the paired electrodes to extend therethrough. Temperature is measured from the resistance of the heat-sensitive portion detected by means of the pair of electrodes.

In order to improve responsiveness of the temperature sensor, various studies have been conducted. For example, according to the temperature sensor disclosed in Patent Document 1, the distance between the heat-sensitive portion (thermistor element) and a housing tube which accommodates the heat-sensitive portion is set to 0.3 mm or less, thereby improving the heat-receiving rate of the heat-sensitive portion. According to the temperature sensor disclosed in Patent Document 2, a distal end portion of the housing tube which accommodates the heat-sensitive portion is thin-walled as compared with the other portion of the housing tube. By employing a thin-walled distal end portion of the housing tube, heat is quickly transferred to the heat-sensitive portion from outside the housing tube.

[Patent Document 1] Japanese Patent Application Laid-Open (kokai) No. 2002-350241

[Patent Document 2] Japanese Patent Application Laid-Open (kokai) No. 2010-32237

3. Problems to be Solved by the Invention

In a certain temperature sensor, the heat-sensitive element, the insulating support and the insulation sheath are sequentially disposed from the distal side such that they contact one another directly or via another member. That is, the heat-sensitive element, the insulating support, and the insulation sheath are disposed in a thermally coupled condition. In this case, heat transfer of heat from the heat-sensitive element toward the rear side through the insulating support and the insulation sheath is apt to arise. The occurrence of such heat transfer increases the time that it takes the temperature of the heat-sensitive portion to reach that of a measurement object. The techniques described in Patent Documents 1 and 2 encounter difficulty in restraining deterioration in responsiveness of the temperature sensor caused by the heat transfer.

SUMMARY OF THE INVENTION

It is therefore an object of the present invention to provide a temperature sensor in which heat transfer from the heat-sensitive element through the insulating support and the insulation sheath is restrained, such that the temperature sensor exhibits high responsiveness.

The above object of the present invention has been achieved by providing a temperature sensor which comprises a heat-sensitive element having a heat-sensitive portion whose electric characteristic varies with temperature, and a seal portion which seals the heat-sensitive portion; an insulating support in contact with a rear end of the heat-sensitive element for supporting the heat-sensitive element; an insulation sheath in contact with a rear end of the insulating support and allowing for wires electrically connected to the heat-sensitive portion to extend therethrough; and a housing tube formed into a closed-bottomed tubular shape having a closed distal end, and accommodating the heat-sensitive element, the insulating support and the insulation sheath. The housing tube comprises a sheath accommodation portion which accommodates the insulation sheath, and a distal accommodation portion which is located on a distal end side of the housing tube with respect to the sheath accommodation portion. The distal accommodation portion has an outside diameter that is smaller than that of the sheath accommodation portion, and accommodates at least half of the insulating support as measured from an axially distal end of the insulating support. Further, the volume of the insulating support is greater than that of the heat-sensitive element.

In the temperature sensor of the present invention, one-half or more of the insulating support in contact with the heat-sensitive element as measured from the axially distal end of the insulating support is accommodated in the distal accommodation portion having an outside diameter that is smaller than that of the sheath accommodation portion. Therefore, the insulating support can effectively receive heat from outside the housing tube via the distal accommodation portion. As a result, since the temperature difference between the heat-sensitive element and the insulating support is reduced, transmission of heat (heat transfer) from the heat-sensitive element to the insulating support can be restrained. Furthermore, in the temperature sensor of the present invention, the volume of the insulating support is greater than that of the heat-sensitive element (a volume including that of the heat-sensitive portion and the seal portion). Therefore, since the amount of heat held by the insulating support is large, even when heat is transferred from the insulating support to the insulation sheath, a variation in temperature of the insulating support can be restrained. Thus, an increase in the temperature difference between the insulating support and the heat-sensitive element can be restrained, so that heat transfer from the heat-sensitive element can be restrained. Therefore, the temperature sensor of the present invention can exhibit high responsiveness by restraining heat transfer.

Desirably, in the temperature sensor according to the present invention, when C represents the minimum inside diameter of a subportion of the distal accommodation portion which accommodates the insulating support, E represents the outside diameter of a portion of the insulating support corresponding to the subportion of the distal accommodation portion, and d represents the thickness of the subportion of the distal accommodation portion, the dimensional relation $0 \leq C - E \leq 2d$ is satisfied. By satisfying the above dimensional relation, the insulating support can more easily receive heat from outside the housing tube. Thus, heat transfer from the heat-sensitive element can be further restrained. Notably, a clearance equal to or less than d may be provided between the inner circumferential surface of the distal accommodation portion of the housing tube and the outer circumferential surface of the insulating support. When the clearance is provided, in the course of manufacturing the temperature sensor, the insulating support in a state of supporting the heat-sensitive element can be easily inserted into the housing tube up to the distal end of the housing tube.

The distal end of the heat-sensitive element may come into contact with the bottom of the distal end of the housing tube. In this case, the heat-sensitive element can quickly receive heat from outside the housing tube via its distal end in contact with the housing tube. Therefore, the temperature sensor of the present invention can exhibit high responsiveness.

The material of the insulating support may comprise one or more selected from the group consisting of alumina, mullite, cordierite, steatite, forsterite, titania and zirconia. By means of the material used to form the insulating support, the insulating support can effectively restrain heat transfer from the heat-sensitive element to the insulating support.

BRIEF DESCRIPTION OF THE DRAWINGS

FIG. 3 is a table showing the results of an evaluation test on the relation of the volume of a heat-sensitive element 21, the volume of an insulating support 31, the positional relation between the insulating support 31 and a housing support 11, and lapping percentage to response time.

DESCRIPTION OF REFERENCE NUMERALS

Figure 1:
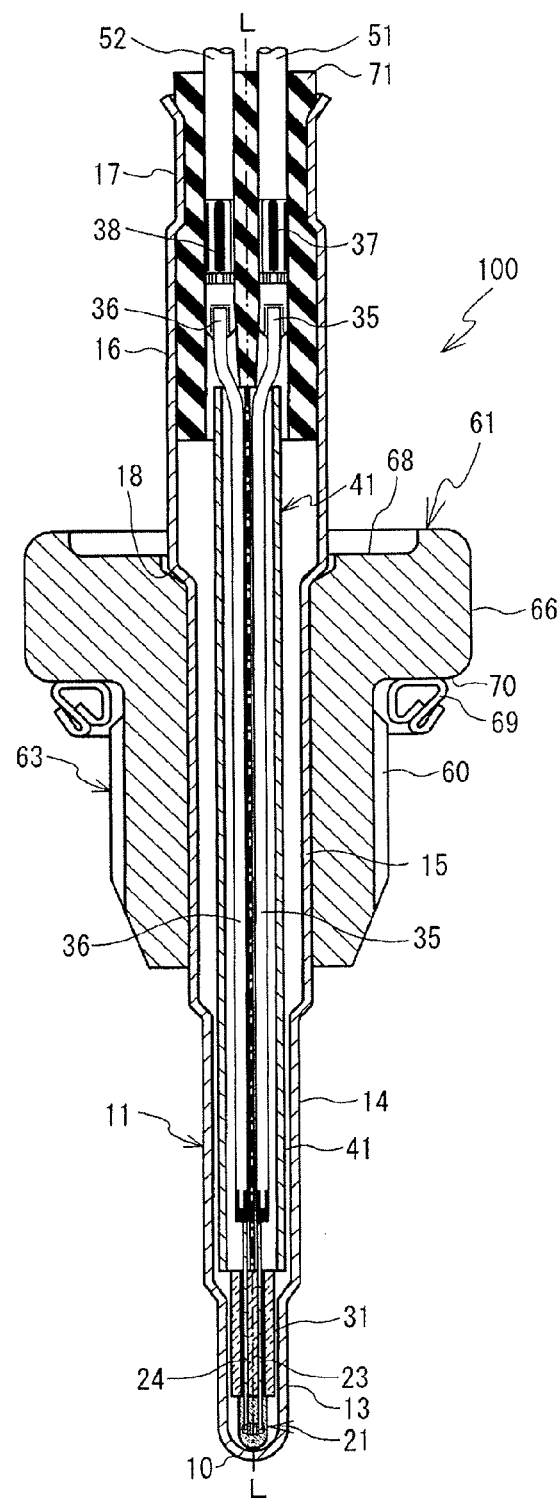
FIG. 1 is a vertical sectional view showing a temperature sensor 100.

Reference numerals used to identify various structure features in the drawings include the following
10: distal end
11: housing tube
13: distal accommodation portion
14, 15: sheath accommodation portion
21: heat-sensitive element
29: seal portion
31: insulating support
35, 36: junction wire
41: insulation sheath
100: temperature sensor

DESCRIPTION OF THE PREFERRED EMBODIMENTS

A temperature sensor 100 according to an embodiment of the present invention will next be described with reference to the drawings. However, the present invention should not be construed as being limited thereto.

Figure 2:
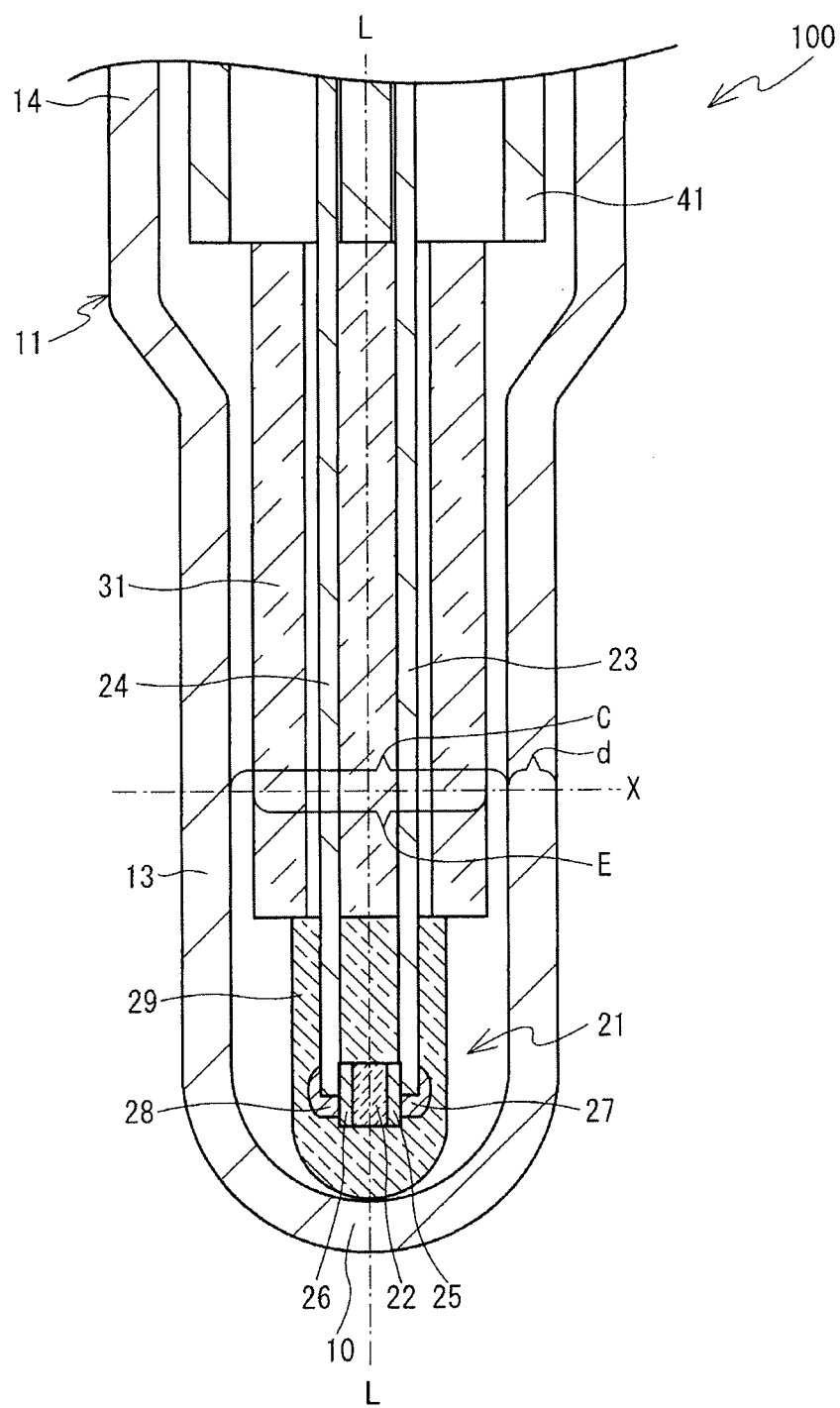
FIG. 2 is an enlarged vertical sectional view showing a distal end portion of the temperature sensor 100.

In the following description, the vertical direction in FIGS. 1 and 2 is referred to as the vertical direction of the temperature sensor 100; the lateral direction in FIGS. 1 and 2 is referred to as the lateral direction of the temperature sensor 100; the near side and the far side with respect to the paper on which FIGS. 1 and 2 appear are referred to as the front side and the back side, respectively, of the temperature sensor 100; the upper side in FIGS. 1 and 2 is referred to as the rear side of the temperature sensor 100; and the lower side on FIGS. 1 and 2 is referred to as the distal side of the temperature sensor 100. In FIGS. 1 and 2, the letter L represents the axis of the temperature sensor 100.

The schematic configuration of the temperature sensor 100 will next be described with reference to FIG. 1. The temperature sensor 100 is attached to, for example, an exhaust pipe for emitting exhaust gas outward from the engine of an automobile (not shown). The temperature sensor 100 includes a housing tube 11, a heat-sensitive element 21, an insulating support 31, an insulation sheath 41, junction wires 35 and 36, lead wires 51 and 52, a screwing member 61, and a seal member 71.

The housing tube 11 is a closed-bottomed tube made of metal (e.g., a stainless steel alloy). The housing tube 11 has a closed distal end 10. The diameter of the housing tube 11 increases stepwise from the distal side toward the rear side in the sequence of a distal accommodation portion 13, a sheath accommodation portion 14/15, and a large-diameter portion 16.

The housing tube 11 accommodates, sequentially from the side toward the distal end 10, the heat-sensitive element 21, the insulating support 31, and the insulation sheath 41. The heat-sensitive element 21 is a thermistor element sealed in glass. The heat-sensitive element 21 will be described in detail below with reference to FIG. 2. The insulating support 31 is an electrically insulative tubular member having two bores and holds two lead wires 23 and 24 extending from the heat-sensitive element 21 through the respective bores. Furthermore, the insulating support 31 is in contact with the rear end of the heat-sensitive element 21, thereby supporting the heat-sensitive element 21. The present embodiment uses alumina to form the insulating support 31. However, another material may be used to form the insulating support 31. Specifically, in addition to alumina, mullite, cordierite, steatite, forsterite, titania and zirconia may be used singly or in combination to form the insulating support 31.

The insulation sheath 41 is in contact with the rear end of the insulating support 31. The insulation sheath 41 is a tubular member having two bores and is formed from a ceramic insulator. As shown in FIG. 1, the insulation sheath 41 holds the junction wires 35 and 36 extending through the respective bores thereof. The end portions of the junction wires 35 and 36 located on the side toward the distal end 10 are connected to the respective lead wires 23 and 24 extending from the heat-sensitive element 21. The junction wires 35 and 36 have terminals 37 and 38, respectively, at rear end portions thereof. Lead wires 51 and 52 are crimp-connected to the terminals 37 and 38, respectively. The lead wires 51 and 52 are adapted to output electric signals therethrough. The lead wires 51 and 52 extend to the exterior of the temperature sensor 100 from the rear end of the large-diameter portion 16 of the housing tube 11.

The screwing member 61 is externally and fixedly fitted to a vertically central portion of the housing tube 11. The screwing member 61 is fixed to the housing tube 11 by means of, for example, brazing between the inner circumferential surface of the screwing member 61 and the outer circumferential surface of the vertically central portion of the housing tube 11. The screwing member 61 includes a threaded tubular portion 63 and a polygonal portion 66. The threaded tubular portion 63 has a thread 60 formed on its outer circumferential surface and is adapted to threadingly fix the temperature sensor 100 into a mounting hole (threaded hole) formed in a manifold of an exhaust pipe (not shown). The polygonal portion 66 is located rearward of the threaded tubular portion 63 and has a flange-like shape projecting in a direction from the axis L toward the outer circumference of the screwing member 61. A rear end surface 68 of the polygonal portion 66 is latched to a distal stepped subportion 18 of the large-diameter portion 16 of the housing tube 11. An annular washer 69 is disposed on a distal end surface 70 of the polygonal portion 66. When the temperature sensor 100 is screwed into the mounting hole (threaded hole) formed in the manifold of the exhaust pipe (not shown), the annular washer 69 provides a seal between the mounting hole and the temperature sensor 100. The distal end of the threaded tubular portion 63 is located on the sheath accommodation portion 15 near the distal end of the sheath accommodation portion 15. A distal end portion of the outer circumferential surface of the threaded tubular portion 63 (a distal end portion of the thread 60) is tapered.

The elastic seal member 71 having two bores is disposed in the large-diameter portion 16 located at a rear end portion of the housing tube 11. The lead wires 51 and 52 extend through the respective bores of the elastic seal member 71. A rear end subportion of the large-diameter portion 16 is crimped into a crimped portion 17 whose diameter is smaller than that of the large-diameter portion 16 as a result of crimping. The crimped portion 17 establishes close contact between the inner circumferential surface of the rear end subportion of the large-diameter portion 16 and an outer circumferential surface of the seal member 71, thereby reliably providing a seal therebetween, and fixes the lead wires 51 and 52 extending through the seal member 71.

A distal end portion of the temperature sensor 100 will next be described in detail with reference to FIG. 2. The heat-sensitive element 21 includes a thermistor sintered-body 22, a pair of electrodes 25 and 26, a pair of bonding electrodes 27 and 28, and a seal portion 29. The thermistor sintered-body 22 is a heat-sensitive portion, has a plate-like shape, and is formed from a material which predominantly contains a metal oxide having a perovskite structure or a spinel structure. The resistance of the thermistor sintered-body 22 varies with the ambient temperature. The electrodes 25 and 26 are laminated on the respective laterally opposite surfaces of the thermistor sintered-body 22 and electrically communicate with the thermistor sintered-body 22. The electrodes 25 and 26 are formed from a noble metal, such as platinum (Pt) or gold (Au).

The lead wires 23 and 24 extend rearward from the electrodes 25 and 26, respectively, and extend through the two respective bores of the insulating support 31. The lead wires 23 and 24 are connected to opposing ends of the thermistor sintered-body 22 and therefore allow for monitoring of the variation in resistance of the thermistor sintered-body with a change in ambient temperature. The lead wires 23 and 24 are formed of dumet wires. Each of the lead wires 23 and 24 has a diameter of 0.2 mm. Similar to the electrodes 25 and 26, the bonding electrodes 27 and 28 are formed from a noble metal, such as platinum (Pt) or gold (Au). The bonding electrodes 27 and 28 join the lead wires 23 and 24 to the electrodes 25 and 26, respectively. The seal portion 29 covers distal end portions of the paired lead wires 23 and 24, the thermistor sintered-body 22, the pair of the electrodes 25 and 26, and the bonding electrodes 27 and 28. In other words, the distal end portions of the paired lead wires 23 and 24, the thermistor sintered-body 22, the pair of the electrodes 25 and 26, and the bonding electrodes 27 and 28 are buried in the seal portion 29. Rear portions of the paired lead wires 23 and 24 extend rearward from the seal portion 29. The seal portion 29 has a circular columnar shape whose distal end is rounded toward the distal end 10, and extends in the vertical direction. The material of the seal portion 29 is glass, such as crystallized glass. The seal portion 29 is adapted to hold the members therein, and to protect the members from the ambient environment.

The heat-sensitive element 21, the insulating support 31, and the insulation sheath 41, from the side toward the distal end 10 to the rear side, are sequentially in contact (connection) with each other in an aligned condition. That is, the heat-sensitive element 21, the insulating support 31, and the insulation sheath 41 are continuously disposed in the axial direction and in a thermally coupled condition. Thus, the thin lead wires 23 and 24 are not exposed from between the heat-sensitive element 21 and the insulating support 31 and from between the insulating support 31 and the insulation sheath 41. Furthermore, since the heat-sensitive element 21, the insulating support 31, and the insulation sheath 41 are in contact (connected) with each other, they are unlikely to be misaligned from each other. Therefore, the possibility of the lead wires 23 and 24 being broken can be reduced. Also, as compared with the case where the heat-sensitive element 21, the insulating support 31, and the insulation sheath 41 are not in contact (not connected) with each other, the temperature sensor 100 is unlikely to be broken even when subjected to vibration. Further, the insulating support 31 having a circular columnar outline has a greater diameter than that of the heat-sensitive element 21. The insulation sheath 41 has a greater diameter than that of the insulating support 31.

The volumes of the heat-sensitive element 21 and the insulating support 31 will next be described. The volume of the insulating support 31 is greater than that of the heat-sensitive element 21. Specifically, the diameter and the vertical length of the insulating support 31 are greater than those of the heat-sensitive element 21. Accordingly, the heat capacity of the insulating support 31 is large, thereby restraining transmission of heat from the heat-sensitive element 21 toward the rear end of the temperature sensor 100. Therefore, the temperature sensor 100 can exhibit high responsiveness by restraining heat transfer.

The volume of the heat-sensitive element 21 means the sum of the volume of the seal portion 29 and the volumes of portions of the lead wires 23 and 24, the electrodes 25 and 26, the bonding electrodes 27 and 28, and the thermistor sintered-body 22, which are covered with the seal portion 29. In order to restrain heat transfer from the heat-sensitive element 21, the following can also be implemented: the vertical length of the heat-sensitive element 21 is increased, and the thermistor sintered-body 22 is disposed at a distal end portion of the heat-sensitive element 21. However, since the seal portion 29 is formed by softening glass, difficulty is encountered in finely adjusting the vertical length of the heat-sensitive element 21. In the temperature sensor 100 of the present embodiment, heat transfer from the heat-sensitive element 21 is reduced by making use of the difference in volume between the heat-sensitive element 21 and the insulating support 31. Thus, since there is no need to finely adjust the vertical length of the heat-sensitive element 21, the temperature sensor 100 can be easily manufactured.

The relationship between the insulating support 31 and the housing tube 11 will next be described. As described above, the housing tube 11 has the sheath accommodation portion 14 and the distal accommodation portion 13 smaller in diameter than the sheath accommodation portion 14. The distal accommodation portion 13 accommodates the heat-sensitive element 21 and half or more of the insulating support 31 as measured from the distal end thereof. In the present embodiment, about 70% of the insulating support 31 as measured from the distal end thereof is accommodated in the distal accommodation portion 13. That is, about 70% of the surface of the insulating support 31 faces the inner circumferential surface of a subportion of the distal accommodation portion 13, and the surface-to-surface distance between the insulating support 31 and the subportion is small. Therefore, as compared with the case where the insulating support 31 is accommodated in a portion of the housing tube 11 having an inside diameter greater than that of the distal accommodation portion 13, the insulating support 31 can more easily receive heat from outside the housing tube 11 via the housing tube 11.

Since the insulating support 31 easily receives ambient heat, the temperature difference between the insulating support 31 and the heat-sensitive element 21 is reduced. As a result, transmission of heat (heat transfer) from the heat-sensitive element 21 toward the rear end of the temperature sensor 100 can be restrained.

The minimum inside diameter of a subportion of the distal accommodation portion 13 which accommodates the insulating support 31 is designated as C. The outside diameter of a portion of the insulating support 31 corresponding to the subportion of the distal accommodation portion 13 is designated as E. The thickness of the subportion of the distal accommodation portion 13 is designated as d. In this case, C, E and d satisfy the following Expression (1).

$$0 \leq C-E \leq 2d \quad (1)$$

That is, as viewed on a straight line X perpendicularly intersecting the axis L, the inner circumferential surface of the distal accommodation portion 13 and the outer circumferential surface of the insulating support 31 are in proximity to each other with a distance (difference in radius) equal to or less than the thickness d of the distal accommodation portion 13 therebetween or in contact with each other. Thus, the insulating support 31 can easily receive ambient heat via the distal accommodation portion 13. If the objective is to merely improve heat-receiving efficiency, the inner circumferential surface of the distal accommodation portion 13 and the outer circumferential surface of the insulating support 31 may be in contact with each other. However, to facilitate manufacturing, a clearance equal to or less than the thickness d is desirably present between the inner circumferential surface of the distal accommodation portion 13 and the outer circumferential surface of the insulating support 31. In this case, a worker engaged in manufacturing the temperature sensor 100 can easily insert the insulating support 31 in a state of supporting the heat-sensitive element 21 into the housing tube 11 up to a distal end portion of the housing tube 11. As a result, the possibility of the insulating support 31 being broken is reduced.

The distal end of the heat-sensitive element 21 is in contact with the bottom of the distal end 10 of the housing tube 11. Thus, the heat-sensitive element 21 can quickly receive heat from outside the housing tube 11 via its distal end in contact with the housing tube 11. Therefore, the temperature sensor 100 can exhibit high responsiveness.

In the temperature sensor 100 according to the present embodiment, the smallest diameter of the heat-sensitive element 21 (excluding a rounded portion thereof) is 1.00 mm, and the diameter of the insulating support 31 is 1.40 mm to 1.55 mm. The thickness of the distal accommodation portion 13 of the housing tube 11 is 0.175 mm to 0.250 mm. The maximum inside diameter of the distal accommodation portion 13 is 1.55 mm to 1.60 mm. The clearance between the inner circumferential surface of the distal accommodation portion 13 and the outer circumferential surface of the insulating support 31 is 0 mm to 0.20 mm.

[Evaluation Test]

An evaluation test was conducted in order to verify that responsiveness is improved by imparting an appropriate shape to the distal end portion of a temperature sensor. Specifically, three temperature sensors (Nos. 1 to 3) differing in the shape of the distal end portion were prepared. The distal end portions of the temperature sensors standing at room temperature (25° C.) were placed in a gaseous phase having a temperature of 300° C. and a velocity of 20 msec. The temperature measured by the respective temperature sensors as a function of time was monitored. The time that had elapsed until 63% of the full range of a temperature change from room temperature (25° C.) to the saturation temperature (300° C.) was reached (the time elapsed until a temperature of 198.25° C. was read) was measured as the response time. FIG. 3 shows the results of the evaluation test.

Temperature sensor No. 1 is a conventional temperature sensor. In temperature sensor No. 1, the volume of the heat-sensitive element 21 is 11.6 $mm^3$, and the volume of the insulating support 31 is 5.7 $mm^3$. Thus, the volume of the insulating support 31 is smaller than that of the heat-sensitive element 21. In temperature sensor No. 1, the aforementioned expression (1) is not satisfied, and the insulating support 31 and the housing tube 11 are not disposed close to each other. Therefore, in temperature sensor No. 1, the percentage of a portion of the insulating support 31 covered with the distal accommodation portion 13 (hereinafter, referred to as the "lapping percentage") is 0%. According to the evaluation test results, the response time of temperature sensor No. 1 was 10.6 seconds.

In temperature sensor No. 2, the volume of the heat-sensitive element 21 is 2.4 $mm^3$, and the volume of the insulating support 31 is 5.3 $mm^3$. Thus, the volume of the insulating support 31 is greater than that of the heat-sensitive element 21. In temperature sensor No. 2, the aforementioned expression (1) is satisfied, and the lapping percentage of the insulating support 31 is 60%. According to the evaluation test results, the response time of temperature sensor No. 2 was 5.3 seconds. The above test results reveal that temperature sensor No. 2 has greatly improved responsiveness as compared with the conventional temperature sensor No. 1.

Temperature sensor No. 3 is the temperature sensor 100 shown in FIGS. 1 and 2. In temperature sensor No. 3, the volume of the heat-sensitive element 21 is 2.4 $mm^3$, and the volume of the insulating support 31 is 8.8 $mm^3$. Thus, the volume of the insulating support 31 is greater than that of the heat-sensitive element 21. In temperature sensor No. 3, the aforementioned expression (1) is satisfied, and the lapping percentage of the insulating support 31 is 70%. According to the evaluation test results, the response time of temperature sensor No. 3 is 4.7 seconds. A comparison of the evaluation test results between temperature sensors No. 2 and No. 3 show that, more desirably, the volume of the insulating support 31 is two times or more the volume of the heat-sensitive element 21.

The invention has been describe in detail by reference to the above embodiment. However, the invention should not be construed as being limited thereto. It should further be apparent to those skilled in the art that various changes in form and detail of the invention as shown and described above may be made. It is intended that such changes be included within the spirit and scope of the claims appended hereto. For example, the following modifications (A) to (D) may be made.

(A) The heat-sensitive element 21 of the above embodiment is a glass-sealed thermistor element. However, the present invention may be applied to a heat-sensitive element other than the glass-sealed thermistor element. For example, the present invention may be applied to a heat-sensitive element configured such that a Pt resistor is formed on an insulating substrate, and the resultant assembly is sealed in glass.

In the temperature sensor 100 of the above embodiment, the heat-sensitive element 21 and the insulating support 31 are disposed in direct contact with each other, and the insulating support 31 and the insulation sheath 41 are disposed in direct contact with each other. However, the heat-sensitive element 21, the insulating support 31 and the insulation sheath 41 may be in indirect contact with one another via other members, such as bonding members.

(C) The distal accommodation portion 13 of the above embodiment has a fixed diameter, except for a distal rounded subportion thereof. However, the diameter of the distal accommodation portion 13 is not necessarily fixed so long as the diameter is smaller than that of the sheath accommodation portion 14/15. For example, a subportion of the distal accommodation portion 13 which accommodates the heat-sensitive element 21 may be smaller in diameter than a subportion of the distal accommodation portion 13 which accommodates the insulating support 31. That is, the distal accommodation portion 13 may be composed of a plurality of subportions differing in diameter. Also, the distal accommodation portion 13 may be formed such that the diameter is reduced toward the distal end thereof.

(D) In the temperature sensor 100, configurational features other than that of the heat-sensitive element 21 may be modified as appropriate. For example, in the temperature sensor 100, members other than the heat-sensitive element 21 may be modified as to shape, material and/or arrangement as needed.

This application is based on Japanese Application No. 2010-184401 filed Aug. 19, 2010, the disclosure of which is incorporated herein by reference in its entirety.

What is claimed is:

1. A temperature sensor comprising:
   a heat-sensitive element having a heat-sensitive portion whose electric characteristic varies with temperature, and a seal portion which seals the heat-sensitive portion;
   an insulating support in contact with a rear end of the heat-sensitive element for supporting the heat-sensitive element, wherein the insulating support is an electrically insulative tubular member having bores allowing for wires electrically connected to the heat-sensitive portion to extend therethrough;
   an insulation sheath being in contact with a rear end of the insulating support and allowing for wires electrically connected to the heat-sensitive portion to extend therethrough; and
   a housing tube formed into a closed-bottomed tubular shape having a closed distal end, and accommodating the heat-sensitive element, insulating support, and insulation sheath;
   the housing tube comprises
   a sheath accommodation portion which accommodates the insulation sheath, and
   a distal accommodation portion which is located on a distal end side of the housing tube with respect to the sheath accommodation portion, the distal end accommodation portion having an outside diameter that is smaller than that of the sheath accommodation portion, and accommodates at least half of the insulating support as measured from an axially distal end of the insulating support, wherein a clearance is provided around an entire circumference between an inner circumferential surface of the distal accommodation portion of the housing tube and an entire outer circumferential surface of the insulating support, and
   a volume of the insulating support is greater than that of the heat-sensitive element.

2. The temperature sensor as claimed in claim 1, wherein the temperature sensor satisfies $0 < C - E \leq 2d$, where C is a minimum inside diameter of a subportion of the distal accommodation portion which accommodates the insulating support, E is an outside diameter of a portion of the insulating support corresponding to the subportion of the distal accommodation portion, and d is a thickness of the subportion of the distal accommodation portion.

3. The temperature sensor as claimed in claim 1, wherein a distal end of the heat-sensitive element is disposed so as to be in contact with a bottom of the distal end of the housing tube.

4. The temperature sensor as claimed in claim 1, wherein the insulating support is formed from a material which comprises one or more selected from the group consisting of alumina, mullite, cordierite, steatite, forsterite, titania and zirconia.

5. The temperature sensor as claimed in claim 2, wherein a distal end of the heat-sensitive element is disposed so as to be in contact with a bottom of the distal end of the housing tube.

6. The temperature sensor as claimed in claim 2, wherein the insulating support is formed from a material which comprises one or more selected from the group consisting of alumina, mullite, cordierite, steatite, forsterite, titania and zirconia.

7. The temperature sensor as claimed in claim 3, wherein the insulating support is formed from a material which comprises one or more selected from the group consisting of alumina, mullite, cordierite, steatite, forsterite, titania and zirconia.

8. The temperature sensor as claimed in claim 1, wherein the material of the seal portion is glass.

* * * * *